Patented Apr. 26, 1938

2,115,332

UNITED STATES PATENT OFFICE 2,115,332

METHOD OF PRODUCING PHENOLIC COMPOUNDS

Charles G. Grosscup, Philadelphia, Pa., assignor to The Sharples Solvents Corporation, Philadelphia, Pa., a corporation of Delaware No Drawing. Application March 24, 1933, Serial No. 662,528

9 Claims. (Cl. 260—154)

The present invention relates to the production of alkyl derivatives of phenolic compounds by the condensation of olefins with phenol or one of its derivatives in the presence of an acid catalyst. It comprises an improvement over the process defined and claimed in the co-pending application of William M. Lee and Lee H. Clark, Serial No. 623,486, filed July 20, 1932.

In the above identified application, a method of producing phenolic derivatives was described, which involves the selective absorption of a desired olefin compound or mixture of olefin compounds from a mixture containing a larger number of such compounds. In the preferred method of procedure, in accordance with that application, the absorption of the desired olefine is obtained by a succession of counter-current batch contacts, in which a given batch of acid successively contacts olefin mixtures containing progressively larger proportions of the olefin material which it is desired to absorb. At the completion of this absorption operation, the acid liquor formed by the absorption of the desired olefin in the acid is contacted with an equimolecular proportion of phenol, the agitation being maintained for approximately one hour. The mixture so obtained is next subjected to a settling operation, and gradually separated into an acid layer and a supernatant oily layer, which is believed to consist principally of alkyl phenyl ether. The acid layer is thereafter drawn off from the oily layer, and the oily layer is subjected to reflux for a period of several hours, at a temperature between 110° and 135° C. to produce the desired alkyl phenolic derivative.

While the process described above constitutes a satisfactory method of producing alkyl derivatives of phenolic compounds, it possesses a number of serious disadvantages. In the first place, the selective absorption of the desired olefin material from the mixture of olefin material in the acid is a difficult and time-consuming operation. This operation is also objectionable because of the fact that it necessarily involves a certain amount of undesired polymerization of the olefins under treatment. In the practice of the Lee and Clark application, an adequate separation of unreacted acid from the acid liquor produced by the absorption treatment is never attained. As a consequence of this fact, an undesirably large quantity of acid remains in the acid liquor when it is mixed with the phenolic compound which is to be condensed with the olefin. This results in an undesired solution of phenol in the acid, and the consequent loss of such phenol, and it also results in the undesired formation of phenol acids. Thus, where sulphuric acid is used as a catalyst, phenol sulphonic acids are formed. Difficulty is also encountered in the practice of the process of the Lee and Clark application in an attempt to separate the oily layer formed by the treatment of the acid liquor with phenol from acid formed during such treatment.

By the practice of the present invention all of the above mentioned difficulties are avoided. The initial acid absorption step is entirely eliminated, and there is accordingly no loss of hydrocarbon due to polymerization. Furthermore, in the practice of the invention, only a very small amount of acid is used and the difficulties encountered in the practice of the Lee and Clark process in connection with the solution of phenol, and the formation of phenol acids and the difficulty of separating the acid catalyst from the oily layer are accordingly obviated.

In the practice of the invention a mixture of olefins is first treated with the phenolic compound to be condensed at substantially normal temperature. A very small trace of an acid adapted to act as a catalyst is added to the mixture of phenol and hydrocarbon, and intimately mixed therewith, the mixture being refluxed to cause a preliminary reaction to take place between the olefin and the phenolic compound. This treatment is carefully controlled to prevent the reaction of the phenolic compound with olefin material in the mixture other than that which it is desired to condense.

The practice of the invention thus involves a treatment of the mixture of hydrocarbon, phenolic compound and catalyst to cause a selective condensation of desired olefin material with the phenol to the exclusion of other olefin material present.

The mixture of reacted and unreacted material is next distilled and the heads passing off at a temperature within the boiling range of the olefin are separately collected. The residue is thereafter digested by heating it to a temperature adapted to cause a conversion of the reaction product of the olefin and phenol, this treatment being continued for a considerable period of time in order to effect a substantially complete conversion of the initial condensation product.

The practice of the invention will be better understood by reference to the following illustrative examples of the production of tertiary amyl phenol by the condensation of iso-amylene with phenol:

Example 1

140 grams of mixed amylenes, comprising approximately 50% normal amylenes and 50% iso-amylenes, were agitated together with 188 grams of phenol, and 1.96 grams of 98% sulphuric acid were then added to the mixture and the entire mass was thoroughly agitated and refluxed for approximately one hour, at a temperature of 42° C. By this treatment the iso-amylene of the mixture was condensed with the phenol, whereas only a very small proportion of the normal amylene was so condensed. The unreacted amylene, consisting principally of normal amylene, was then removed by distillation of the mixture up to 60° C. The residue, comprising 260 grams of material, was digested for a period of four hours, at a temperature of 135° C. The crude amyl phenol so obtained was then washed and neutralized and purified by fractional distillation under reduced pressure. 110 grams of material, comprising principally tertiary amyl phenol, and having a melting range from 60-72° C. was obtained.

Example 2

188 grams of phenol were mixed with 140 grams of amylene mixture in the same manner as described in connection with Example 1, above. 3.16 grams of 62% sulphuric acid were added to the mixture and thoroughly agitated therewith. The entire mixture was then refluxed for a period of two hours at a temperature of 43° C. and the unreacted amylene removed by distillation, as in Example 1, above. The remaining mixture was then digested, washed, neutralized and purified, as in Example 1, and yielded 70 grams of tertiary amyl phenol cut, melting from 69–79.5° C.

Example 3

188 grams of phenol were mixed with 140 grams of mixed amylenes, as in Example 1, above. 2.89 grams of a mixture of equal parts by volume of glacial acetic and sulphuric acids were added to the mixture and intimately agitated therewith. The material was then refluxed, distilled, digested and purified, as in connection with Example 2, above, and yielded 106 grams of a tertiary amyl phenol cut, having a melting range from 74–84° C.

Modifications of the invention will be obvious to those skilled in the art and I do not, therefore, wish to be limited except by the scope of the sub-joined claims, as interpreted in the light of the spirit of the invention.

I claim:

1. A process of making alkyl derivatives of phenols that comprises mixing at least one phenol with a hydrocarbon material including at least one olefin, and with a condensation catalyst comprising a mixture of sulphuric and acetic acids, regulating the temperature and concentration of the catalyst so that the phenol and olefin react but the remainder of the hydrocarbon material substantially does not, and thereafter removing the unreacted hydrocarbon material.

2. A process of preparing tertiary alkyl hydroxy-aromatic compounds that comprises subjecting a mixture of hydroxy-aromatic material and olefins, some of which are normal olefins and some of which are iso-olefins, to reaction conditions of time and temperature sufficient to cause only a preliminary reaction to take place between the hydroxy-aromatic material and the iso-olefins, but which conditions are less severe than are necessary to cause substantial nuclear alkylation of the hydroxy-aromatic material or substantial reaction between the hydroxy-aromatic material and the normal olefins, separating the normal olefins from the initial reaction product so formed, and thereafter subjecting the initial reaction product to conditions of increased temperature to cause nuclear alkylation of the aromatic material to take place, to form a tertiary alkyl hydroxy-aromatic compound.

3. A process of preparing tertiary alkyl hydroxy-aromatic compounds that comprises subjecting, in the presence of an acid catalyst, a mixture of hydroxy-aromatic material and olefins, some of which olefins are normal olefins and some of which are iso-olefins, to reaction conditions of time and temperature sufficient to cause only a preliminary reaction to take place between the hydroxy-aromatic material and the iso-olefins, but which conditions are less severe than are necessary to cause substantial nuclear alkylation of the hydroxy-aromatic material or substantial reaction between the hydroxy-aromatic material and the normal olefins, separating the normal olefins from the initial reaction product so formed, and thereafter subjecting the initial reaction product to conditions of increased temperature to cause nuclear alkylation of the aromatic material to take place, to form a tertiary alkyl hydroxy-aromatic compound.

4. A process for preparing tertiary amyl phenol which comprises subjecting a mixture of amylenes containing both normal and iso-amylenes and phenol to reaction conditions of time and temperature sufficient to cause only a preliminary reaction to take place between the phenol and the iso-amylenes but which conditions are less severe than are necessary to cause substantial nuclear alkylation of the phenol or substantial reaction between the phenol and the normal amylenes, separating the normal amylenes from the initial reaction product so formed and thereafter subjecting the initial reaction product to conditions of increased temperature to cause nuclear alkylation of the phenol to take place to form tertiary amyl phenol.

5. A process for preparing tertiary amyl phenol which comprises subjecting, in the presence of an acid catalyst, a mixture of amylenes containing both normal and iso-amylenes and phenol to reaction conditions of time and temperature sufficient to cause only a preliminary reaction to take place between the phenol and the iso-amylenes but which conditions are less severe than are necessary to cause substantial nuclear alkylation of the phenol or substantial reaction between the phenol and the normal olefins, separating the normal olefins from the initial reaction product so formed and thereafter subjecting the initial reaction product to conditions of increased temperature to cause nuclear alkylation of the phenol to take place to form tertiary amyl phenol.

6. A process of preparing tertiary alkyl hydroxy-aromatic compounds that comprises subjecting, in the presence of a catalytic amount of sulphuric acid, a mixture of hydroxy-aromatic material and olefins, some of which olefins are normal olefins and some of which are iso-olefins, to reaction conditions of time and temperature sufficient to cause only a preliminary reaction to take place between the hydroxy-aromatic material and the iso-olefins, but which conditions are less severe than are necessary to cause substantial nuclear alkylation of the hydroxy-aromatic material or substantial reaction between the hydroxy-aromatic material and the normal olefins, separating the normal olefins from the initial reaction product so formed and thereafter subjecting the initial reaction product to conditions of increased temperature to cause nuclear alkylation of the hydroxy-aromatic material to take place, to form a tertiary alkyl hydroxy-aromatic compound.

7. A process of preparing tertiary alkyl hydroxy-aromatic compounds that comprises subjecting a mixture of hydroxy-aromatic material and olefins, some of which olefins are normal olefins and some of which are iso-olefins, to a temperature of around 42° C. to cause a preliminary reaction to take place between the hydroxy-aromatic material and the iso-olefins, separating the normal olefins from the initial reaction product so formed, and thereafter subjecting the initial reaction product to a temperature between about 110° C. and about 135° C. to cause nuclear alkylation of the hydroxy-aromatic material to take place, to form a tertiary alkyl hydroxy-aromatic compound.

8. A process of preparing tertiary alkyl hydroxy-aromatic compounds that comprises subjecting in the presence of a catalytic amount of sulphuric acid a mixture of hydroxy-aromatic material and olefins, some of which olefins are normal olefins and some of which are iso-olefins, to a temperature of around 42° C. for about one to two hours to cause a preliminary reaction to take place between the hydroxy-aromatic material and the iso-olefins, separating the normal olefins from the initial reaction product so formed, and thereafter subjecting the initial reaction product to a temperature between about 110° C. and about 135° C. to cause nuclear alkylation of the hydroxy-aromatic material to take place, to form a tertiary alkyl hydroxy-aromatic compound.

9. A process for preparing tertiary amyl phenol which comprises subjecting in the presence of a catalytic amount of sulphuric acid a mixture of amylenes containing both normal and iso-amylenes and phenol to a temperature of about 42° C. for about one to two hours to cause a preliminary reaction to take place between the phenol and the iso-amylenes, separating the normal amylenes from the initial reaction product so formed and thereafter subjecting the initial reaction product to a temperature between about 110° C. and about 135° C. to cause nuclear alkylation of the phenol to take place to form tertiary amyl phenols.

CHARLES G. GROSSCUP.